United States Patent
Ito

(10) Patent No.: US 12,452,586 B2
(45) Date of Patent: Oct. 21, 2025

(54) ACOUSTIC DEVICE

(71) Applicant: Alps Alpine Co., Ltd., Tokyo (JP)

(72) Inventor: Ryo Ito, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 215 days.

(21) Appl. No.: 18/454,980

(22) Filed: Aug. 24, 2023

(65) Prior Publication Data
US 2024/0073597 A1    Feb. 29, 2024

(30) Foreign Application Priority Data
Aug. 29, 2022    (JP) ................... 2022-135929

(51) Int. Cl.
| | |
|---|---|
| H04R 1/40 | (2006.01) |
| H04R 1/02 | (2006.01) |
| H04R 1/28 | (2006.01) |
| B60N 2/879 | (2018.01) |

(52) U.S. Cl.
CPC ............. *H04R 1/403* (2013.01); *H04R 1/025* (2013.01); *H04R 1/2819* (2013.01); *B60N 2/879* (2018.02); *H04R 2499/13* (2013.01)

(58) Field of Classification Search
CPC ...... H04R 1/403; H04R 1/025; H04R 1/2819; H04R 1/2815; H04R 1/283; H04R 2499/13; H04R 1/20; H04R 5/023; H04R 1/2834; B60N 2/879
See application file for complete search history.

(56) References Cited

U.S. PATENT DOCUMENTS

| | | | |
|---|---|---|---|
| 5,687,246 A * | 11/1997 | Lancon | B60R 11/0217 |
| | | | 381/338 |
| 9,517,732 B2 * | 12/2016 | Silzle | H04R 1/025 |
| 10,239,432 B2 | 3/2019 | Subot et al. | |
| 11,470,417 B1 * | 10/2022 | Delgado, Jr. | H04R 1/2857 |
| 2019/0215606 A1 * | 7/2019 | You | B60N 2/879 |
| 2021/0061152 A1 * | 3/2021 | Servadio | B60N 2/879 |
| 2021/0339666 A1 * | 11/2021 | Soltner | B60N 2/879 |
| 2022/0303670 A1 * | 9/2022 | Otsuki | H04R 1/24 |
| 2023/0209261 A1 * | 6/2023 | Homma | B60N 2/879 |
| | | | 381/301 |

FOREIGN PATENT DOCUMENTS

| | | |
|---|---|---|
| EP | 3 868 602 A1 | 8/2021 |
| JP | 2007-221485 A | 8/2007 |

OTHER PUBLICATIONS

Extended European Search Report from EP 23192738.5, Feb. 6, 2024, 9pp.

* cited by examiner

*Primary Examiner* — Jason R Kurr
(74) *Attorney, Agent, or Firm* — Crowell & Moring LLP

(57) ABSTRACT

A speaker unit on the left side and a speaker unit on the right side are included in a case positioned behind a listener. Sound generation openings and bass-reflex ports are formed in the case on the left side and right side. From each sound generation opening, sound pressure generated forward by the relevant speaker unit is output. Each bass-reflex port communicates with an air chamber to which sound pressure behind the speaker unit is transmitted. With each sound generation opening, the opening dimension in the up-down direction is larger than the opening dimension in the horizontal direction. With each bass-reflex port, as well, the opening dimension in the up-down direction is larger than the opening dimension in the horizontal direction.

2 Claims, 8 Drawing Sheets

FIG. 5
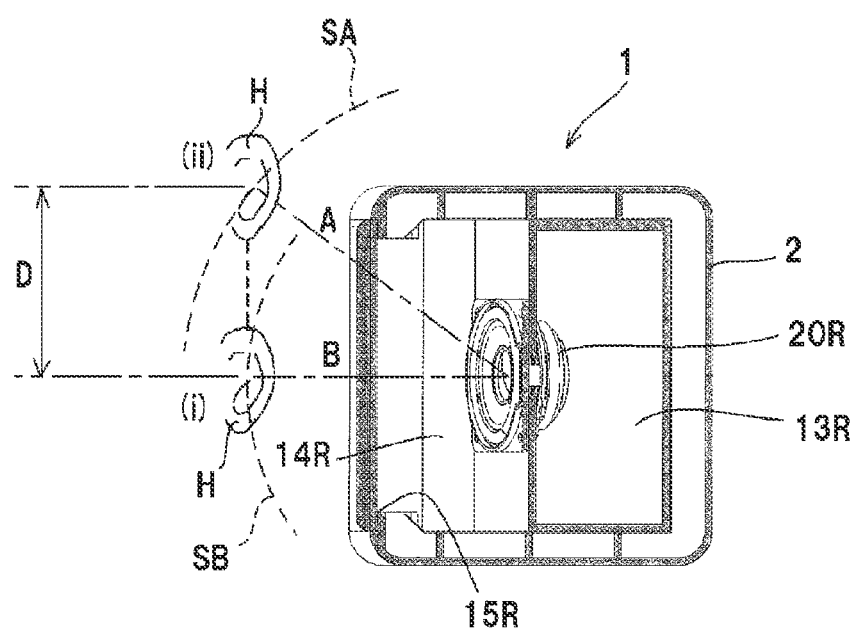
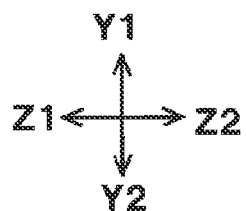

ACOUSTIC DEVICE

RELATED APPLICATION

The present application claims priority to Japanese Patent Application No. 2022-135929, filed Aug. 29, 2022, the entirety of which is herein incorporated by reference.

BACKGROUND

1. Field

The present disclosure relates to an acoustic device that generates sound pressure toward a listener sitting on, for example, a seat in an automobile.

2. Description of the Related Art

A speaker device incorporated into the backrest or headrest of a chair is described in JP 2007-221485 A. With this speaker device, an enclosure in which a space having a predetermined volume is incorporated into the backrest or headrest. A hole is formed at the front of the enclosure. A speaker unit that converts electric signals to sounds is attached in the hole. A tubular duct, which works as a bass-reflex duct, is linked to the enclosure. As a whole, therefore, the speaker unit functions as a bass-reflex speaker.

With the speaker in FIG. 3 of JP 2007-221485 A, a tubular duct extends upward from a speaker unit, and the duct end is oriented to the ear of a listener. With the speaker in FIG. 5, a speaker unit is positioned slightly below the ear of the listener, and the duct end of a tubular duct is positioned on the outside of the speaker unit in the horizontal direction, so as to be side by side with the speaker unit. According to the description in paragraph [0031] and later, in the structure in FIG. 5, there is almost no difference between the length of a path for middle-pitched sounds from the speaker unit to the inlet of the external auditory meatus of the ear, and the length of a path for low-pitched sounds from the duct end to the inlet of the external auditory meatus of the ear. However, in the structure in FIG. 3, the length of a path from the speaker unit to the inlet of the external auditory meatus is shorter than the length of a path from the duct end to the inlet of the external auditory meatus, so the sound pressure levels of low-pitched sounds can be raised.

As described in paragraph and later in JP 2007-221485 A, the sound pressure levels of audible low-pitched sounds in a bass-reflex speaker vary depending on the length of a path through which sound pressure directed from the duct end arrives at the inlet of the external auditory meatus. With the speaker device described in JP 2007-221485 A, the opening at the end of the duct is a true circle in shape, and the area of the opening is small. Therefore, when the height position of the inlet of the external auditory meatus varies, depending on the sitting height of the sitting listener, or the position of the inlet of the external auditory meatus on the head of the listener, or when the listener changes the sitting posture and the height position of the inlet of the external auditory meatus is thereby changed, the length of the path for low-pitched sounds from the duct end to the inlet of the external auditory meatus changes greatly. This means that the sound pressure levels of low-pitched sounds to be listened to vary depending on the listener, or depending on the sitting posture. This prevents the listener from obtaining the best sounds expected from the bass-reflex speaker.

The present disclosure addresses the conventional problem described above, with an object of providing an acoustic device that can effectively provide sounds expected for a bass-reflex speaker, even during changes of the position of the ear of a listener sitting on, for example, a seat in an automobile.

SUMMARY

An acoustic device of the present disclosure has a case and a speaker unit disposed in the case.

A direction in which the face of a listener is oriented is referred to as a forward direction, a side opposite to a side in the forward direction is referred to as a rear side, a direction in which the left and right ears of the listener are aligned is referred to as a horizontal direction, and a direction orthogonal to both the forward direction and the horizontal direction is referred to as an up-down direction.

The case is positioned on the rear side of the listener. The speaker unit is disposed so that sounds generated by it are directed forward.

The case includes an air chamber to which air vibration on the rear side of the speaker unit is transmitted, and a bass-reflex port that communicates with the air chamber and is open in the forward direction.

With the bass-reflex port, the opening dimension in the up-down direction is larger than the opening dimension in the horizontal direction.

The acoustic device of the present disclosure can be structured so that a pair of speaker units and a pair of bass-reflex ports are provided so that each pair is line-symmetric in the horizontal direction with respect to a center line extending in the up-down direction.

The case of the acoustic device of the present disclosure preferably includes a head-facing portion that faces the back of the head of the listener, sound generation spaces, to each of which air vibration in front of one of the speaker units is transmitted, and sound generation openings, each of which communicates with one of the sound generation spaces, and is open at one of both ends of the head-facing portion in the horizontal direction.

Each of the bass-reflex ports is preferably open on the outside of one of the sound generation openings in the horizontal direction.

With the sound generation opening as well, the opening dimension in the up-down direction is preferably larger than the opening dimension in the horizontal direction.

An acoustic device according to the present disclosure has a case and a speaker unit disposed in the case.

The case is positioned on the rear side of the listener. The speaker unit is disposed so that sounds generated by it are directed forward.

The case includes an air chamber to which air vibration on the rear side of the speaker unit is transmitted, and a passive vibrating body that receives pressure in the air chamber.

The passive vibrating body is oriented in the forward direction. The dimension of the passive vibrating body in the up-down direction is larger than its dimension in the horizontal direction.

The acoustic device of the present disclosure is structured so that a pair of speaker units and a pair of passive vibrating bodies are provided so that each pair is line-symmetric in the horizontal direction with respect to a center line extending in the up-down direction.

The case of the acoustic device of the present disclosure preferably includes a head-facing portion that faces the back of the head of the listener, sound generation spaces, to each of which air vibration in front of one of the speaker units is transmitted, and sound generation openings, each of which communicates with one of the sound generation spaces and is open at one of both ends of the head-facing portion in the horizontal direction.

Each of the passive vibrating bodies is preferably positioned in one of the sound generation spaces.

With the sound generation opening, as well, the opening dimension in the up-down direction is preferably larger than the opening dimension in the horizontal direction.

The acoustic device of the present disclosure is structured so that the bass-reflex port or passive vibrating body is elongated in the up-down direction. Therefore, even when the sitting height or the position of the ear on the head varies, depending on the sitting listener, or the height position of the ear changes because the listener changes his or her sitting posture, an extreme change can be suppressed in the sound pressure levels of low-pitched sounds to be listened to, so the best sound can be always obtained.

BRIEF DESCRIPTION OF THE DRAWINGS

FIG. 5 is a partial longitudinal sectional view of the vehicle-mounted acoustic device in FIG. 1, as taken along a plane including line V-V;

DESCRIPTION OF THE PREFERRED EMBODIMENTS

Figure 1:
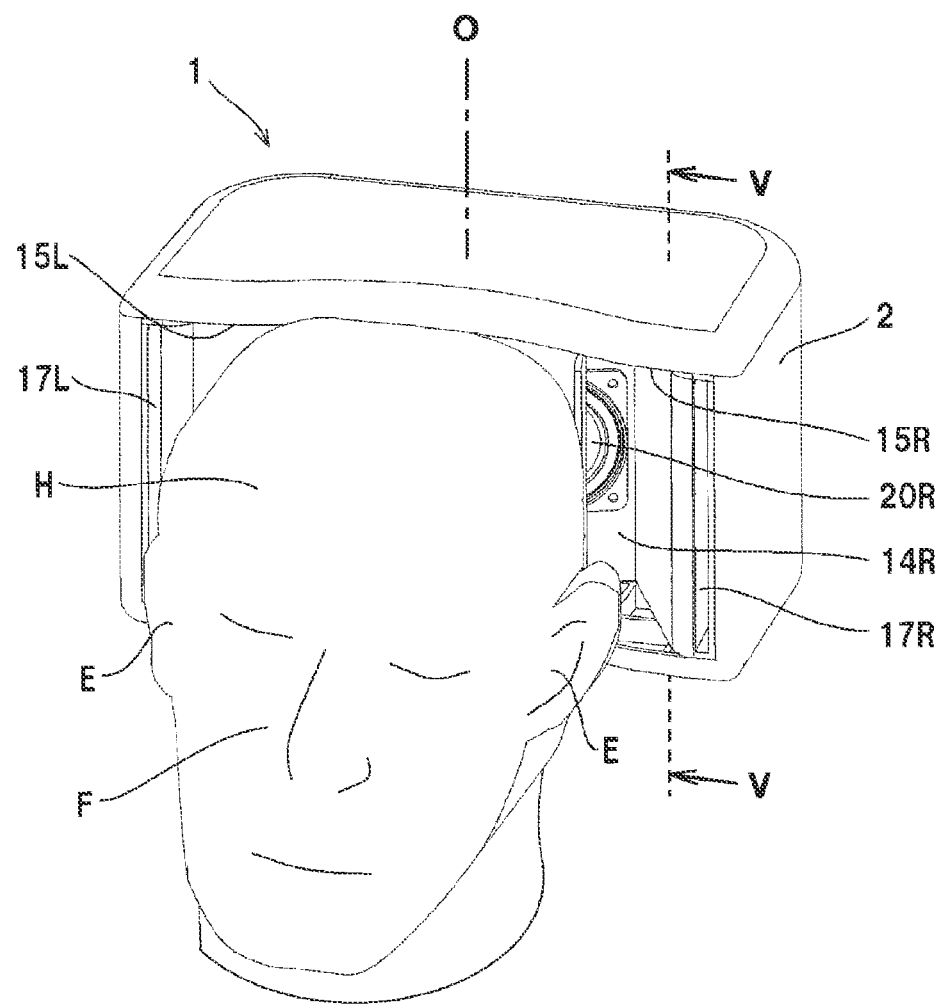
FIG. 1 is a perspective view in which the head of a listener and a vehicle-mounted acoustic device, which is a first embodiment of the acoustic device of the present disclosure, are viewed diagonally from the front of the vehicle-mounted acoustic device.
Figure 2:
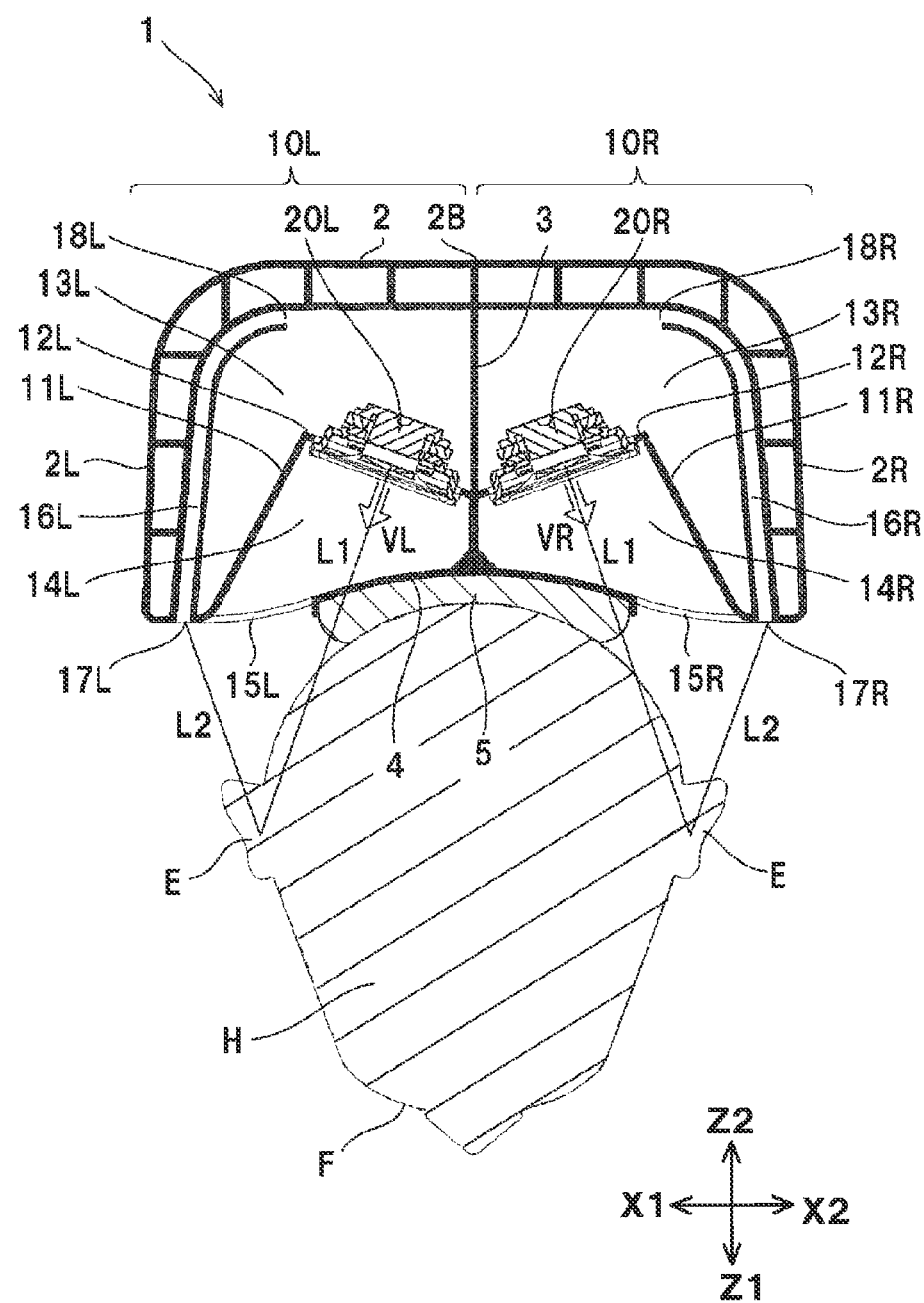
FIG. 2 is a plan sectional view illustrating the head of the listener and the vehicle-mounted acoustic device in the first embodiment.

A vehicle-mounted acoustic device 1 in a first embodiment of the present disclosure is illustrated in FIGS. 1 to 5. The vehicle-mounted acoustic device 1 has a case 2, which is a head restraint positioned at the top of the sheet back of a seat in an automobile, or which forms part of a head restraint by, for example, being embedded in the head restraint. In FIGS. 1 and 2, the head H of a listener, who is an occupant in the automobile, is illustrated. The acoustic device in the present disclosure may be attached to a seat provided in a vehicle other than automobiles, such as a train, for example. Alternatively, the acoustic device may be attached to a seat provided in a house or a theater.

In the drawings illustrating the vehicle-mounted acoustic device 1, the Z1-Z2 direction is the front-back direction, the Z1 direction being forward, the Z2 direction being backward. The direction in which the face F of the listener is oriented is forward (Z1 direction). A portion positioned backward (in the Z2 direction) is the back. The X1-X2 direction is the horizontal direction, the X1 direction being leftward, the X2 direction being rightward (as viewed on the page). The direction in which the left ear E and right ear E of the listener are aligned is the horizontal direction. The Y1-Y2 direction is the up-down direction, the Y1 direction being upward, the Y2 direction being downward. The Y1-Y2 direction is orthogonal to both the front-back direction (Z1-Z2 direction) and the horizontal direction (X1-X2 direction).

Figure 3:
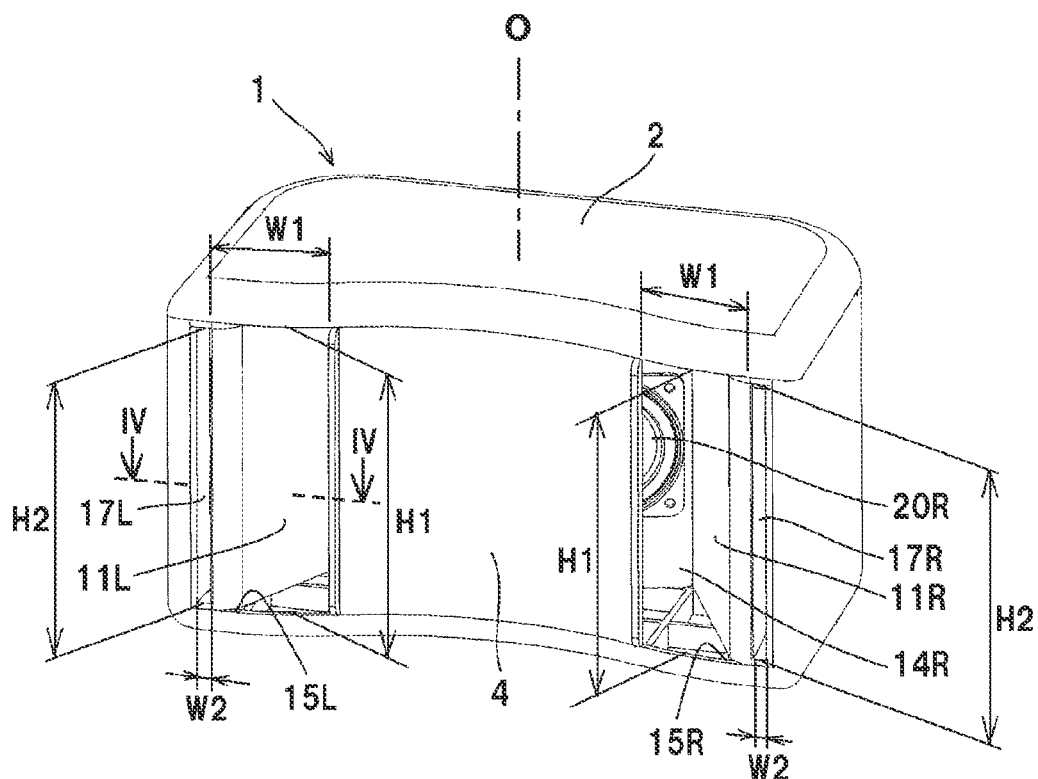
FIG. 3 is a perspective view in which the vehicle-mounted acoustic device in FIG. 1 is viewed diagonally from the front of the vehicle-mounted acoustic device.

The entire structure of the vehicle-mounted acoustic device 1 is illustrated in FIGS. 1 to 3. In the case 2, a left-right partition 3 formed so as to be parallel to a Y-Z plane is provided at a position at which the left-right partition 3 divides the structure into two parts in the front-back direction (X1-X2 direction), as illustrated in FIG. 2. In FIGS. 1 and 3, a center line O, which passes through part of the left-right partition 3 and extends in the up-down direction, is indicated. The left half of the vehicle-mounted acoustic device 1 with respect to the left-right partition 3 is a left acoustic portion 10L, and the right half is a right acoustic portion 10R. The left acoustic portion 10L and right acoustic portion 10R are line-symmetric with respect to the center line O in the left-right direction and are plane-symmetric with respect to the left-right partition 3 in the left-right direction.

At the front of the case 2, a head-facing portion 4 is formed so as to face the back of the head H of the listener, as illustrated in FIGS. 1 to 3. A cushion 5 is provided in front of the head-facing portion 4 as illustrated in FIG. 2 so that the listener can press the head H against the cushion 5.

Figure 4:
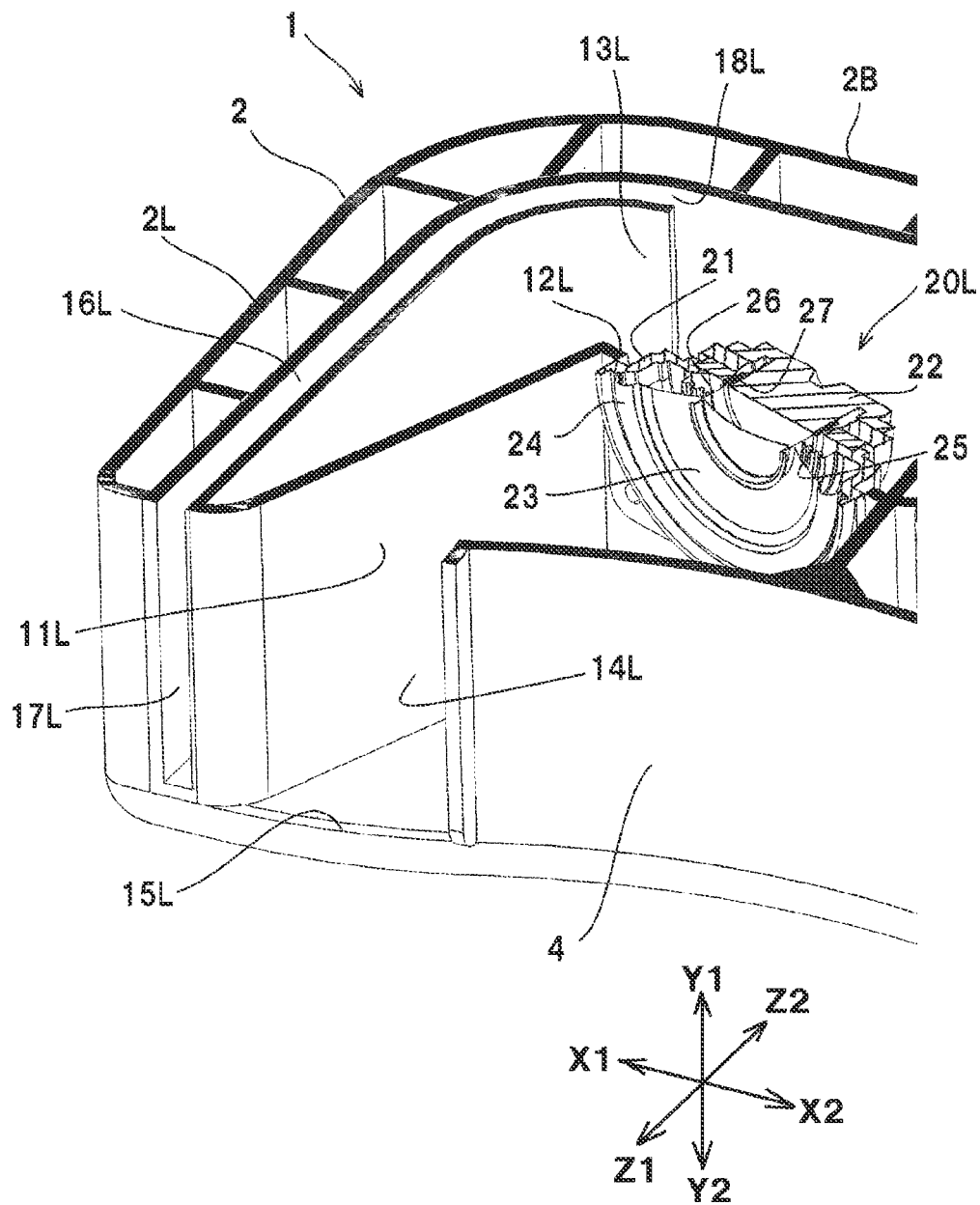
FIG. 4 is a perspective view illustrating a partial section of the vehicle-mounted acoustic device in FIG. 3, as taken along a plane including line IV-IV.

The case 2 is assembled from a plurality of parts formed from synthetic resin materials by being injection-molded or from a plurality of parts formed from light metal materials by being die-cast. In the case 2, the left acoustic portion 10L includes a front-back partition 11L at a position on the left side of the left-right partition 3 as illustrated in FIGS. 3 and 4. Part of the front-back partition 11L, the part being close to the left-right partition 3, is a speaker support 12L. A speaker unit 20L on the left side is fixed to the speaker support 12L.

In the speaker unit 20L, a frame 21 is fixed to the speaker support 12L as illustrated in FIG. 4. A magnetic circuit 22 is fixed at the back of the frame 21. At the front of the frame 21, a diaphragm 23 in a cone shape is supported by an edge member 24 and a damper member 25 so that the diaphragm 23 can vibrate in the front-back direction. A bobbin 26 extending backward is fixed to the diaphragm 23. A voice coil 27 wound around the bobbin 26 is positioned in a magnetic gap of the magnetic circuit 22. In the speaker unit 20L, the diaphragm 23 vibrates in the front-back direction due to a voice current supplied to the voice coil 27, generating sound pressure (air vibration) in the forward direction (Z1 direction) of the diaphragm 23 and its backward direction (Z2 direction).

The right acoustic portion 10R also includes a front-back partition 11R. Part of the front-back partition 11R is a speaker support 12R. The frame 21 of a speaker unit 20R on the right side is fixed to the speaker support 12R. The speaker unit 20R on the right side is identical to the speaker unit 20L on the left side. In the speaker unit 20R, as well, the magnetic circuit 22, diaphragm 23, and the like are supported by the frame 21.

In the left acoustic portion 10L, the interior of the case 2 is partitioned into an air chamber 13L formed behind the front-back partition 11L (in the Z2 direction), and a sound generation space 14L formed ahead of the front-back partition 11L (Z1 direction), as illustrated in FIGS. 2 and 4. Air vibration generated forward from the speaker unit 20L is transmitted to the sound generation space 14L, and air vibration generated backward is transmitted to the air chamber 13L. In the right acoustic portion 10R, as well, the interior of the case 2 is partitioned into an air chamber 13R formed behind the front-back partition 11R, and a sound generation space 14R formed ahead of the front-back partition 11R.

As illustrated in FIG. 2, the speaker support 12L in the left acoustic portion 10L is inclined in the clockwise direction in plan view, and a sound generation direction (direction in which air vibration is generated) VL of the speaker unit 20L is slightly inclined toward the left side (X1 direction), with respect to the forward direction (Z1 direction). The speaker support 12R in the right acoustic portion 10R is inclined in the counterclockwise direction in plan view, and a sound generation direction VR of the speaker unit 20R is slightly inclined toward the right side (X2 direction), with respect to the forward direction (Z1 direction). Even when the sound generation directions VL and VR are oriented at a slightly oblique angle with respect to the forward direction, as described above, these directions will be described as the forward direction. That is, in this description, the term "forward direction" and similar terms not only mean a state oriented exactly in the Z1 direction, but also mean a direction inclined toward the left side or right side in the left-right direction from the Z1 direction.

In the left acoustic portion 10L, a sound generation opening 15L communicating with the sound generation space 14L is formed so as to be oriented in the forward direction, as illustrated in FIGS. 2 to 4. In the right acoustic portion 10R, as well, a sound generation opening 15R communicating with the sound generation space 14R is formed so as to be oriented in the forward direction. The sound generation opening 15L is open to the outside on the left side of the head-facing portion 4 of the case 2. The sound generation opening 15R is open to the outside on the right side of the head-facing portion 4 of the case 2.

In the left acoustic portion 10L, a duct 16L is provided that extends to the inside of the rear wall 2B along the inside of the left wall 2L of the case 2, and a rear opening 18L formed at an end of the duct 16L communicates with the air chamber 13L, as illustrated in FIGS. 2 and 4. On the front surface of the case 2, the duct 16L is open in the forward direction. This opening is a bass-reflex port 17L on the left side. In the right acoustic portion 10R, as well, a duct 16R is provided that extends to the inside of a rear wall 2B along the inside of the right wall 2R of the case 2. A rear opening 18R formed at an end of the duct 16R communicates with the air chamber 13R. The duct 16R is open in the forward direction. This opening is a bass-reflex port 17R on the right side.

With the sound generation opening 15L on the left side, and the sound generation opening 15R on the right side, the opening dimension W1 in the horizontal direction is larger than the opening dimension H1 in the up-down direction, as illustrated in FIG. 3. With the bass-reflex port 17L formed on the outside on the left side of the sound generation opening 15L so as to be aligned with the sound generation opening 15L, and the bass-reflex port 17R formed on the outside on the right side of the sound generation opening 15R so as to be aligned with the sound generation opening 15R, the opening dimension H2 in the up-down direction is larger than the opening dimension W2 in the horizontal direction. The opening dimension H1 of the sound generation openings 15L and 15R in the up-down direction, and the opening dimension H2 of the bass-reflex ports 17L and 17R in the up-down direction, are almost equal to each other. The phase "almost equal" means that the difference between the opening dimension H1 and the opening dimension H2 is 10% or less of H1 and H2, whichever is larger (in FIG. 3, H1 is larger) and that the difference is preferably 5% or less.

Since the vehicle-mounted acoustic device 1 includes the bass-reflex ports 17L and 17R, it functions as a so-called bass-reflex speaker. The duct 16L of the left acoustic portion 10L and the duct 16R of the right acoustic portion 10R have a constant cross section throughout their lengths in their depth direction. The resonance frequency of the bass-reflex speaker in a low-frequency band is determined by the cross sections and depths of the ducts 16L and 16R, and the volumes of the air chambers 13L and 13R. Air vibration in which low-pitched sounds are enhanced can be generated from the bass-reflex ports 17L and 17R in the forward direction. The opening dimension W2 of the bass-reflex ports 17L and 17R in the horizontal direction is determined by the value of the cross section of the ducts 16L and 16R. However, when the opening dimension H2 in the up-down direction is elongated, the opening dimension W2 in the horizontal direction can be considerably narrowed. As a result, the opening dimension W1 of the sound generation openings 15L and 15R formed inside the bass-reflex ports 17L and 17R can be widened accordingly. This enables high-level sound pressure (air vibration) to be effectively provided from the speaker units 20L and 20R to the ears E of the listener.

Next, the operation of the vehicle-mounted acoustic device 1 will be described.

When different driving signals created according to stereo sound sources are given to the speaker unit 20L on the left side, and to the speaker unit 20R on the right side, the diaphragm 23 in the speaker unit 20L and the diaphragm 23 in the speaker unit 20R are caused to vibrate in the front-back direction. Sound pressure (air vibration) is generated in the sound generation direction VL, due to the vibration of the diaphragm 23 in the speaker unit 20L. The sound pressure is transmitted from the sound generation space 14L through the sound generation opening 15L to the ear E of the listener on the left side. Similarly, sound pressure is generated in the sound generation direction VR, due to the vibration of the diaphragm 23 in the speaker unit 20R. The sound pressure is transmitted from the sound generation space 14R through the sound generation opening 15R to the ear E of the listener on the right side.

Air vibration that becomes back pressure, having a phase opposite to the phase of air pressure generated in the sound generation direction VL, is transmitted from the speaker unit 20L to the air chamber 13L. Then, due to vibration of air in the air chamber 13L and air in the duct 16L, sound pressure in which low-pitched sounds are enhanced as a result of phase inversion is generated forward from the bass-reflex port 17L on the left side, and is provided to the ear E on the left side. Similarly, in the right acoustic portion 10R, sound pressure in which a low-pitched sound range is enhanced is generated from the bass-reflex port 17R on the right side, and is provided to the ear E on the right side.

The acoustic effect, in which low-pitched sounds are enhanced, of the bass-reflex speaker is affected by a balance between a distance L1 (see FIG. 2) from the center of the diaphragm 23 in the speaker units 20L and 20R to the sound sensing portion in the ear E, and a distance L2 (see FIG. 2) from the bass-reflex ports 17L and 17R to the sound sensing portion in the ear E. The vehicle-mounted acoustic device 1 is designed so that an optimum acoustic effect in which low-pitched sounds are enhanced is provided by appropriately setting the resonance frequency, as determined by the cross sections and depths of the ducts 16L and 16R, and the volumes of the air chambers 13L and 13R, and by taking an appropriate balance between the distances L1 and L2 in the horizontal direction (X1-X2 direction). In addition, as illustrated in FIG. 3, both the opening dimension H1 of the sound generation openings 15L and 15R in the up-down direction, and the opening dimension H2 of the bass-reflex ports 17L and 17R in the up-down direction, are elongated in the up-down direction, and the opening dimension H1 and opening dimension H2 are almost equal to each other. Therefore, even when the height position of the ear E changes in the up-down direction, the relation between the distances L1 and L2, illustrated in FIG. 2, in a plane can always be maintained. This can enhance low-pitched sound range, and can provide a well-balanced acoustic effect in all bands, regardless of variations in the height position of the ear E.

FIG. 5 illustrates the relative positions of the ear E of the listener on the right side with respect to the position of the vehicle-mounted acoustic device 1. when the ear E of the listener changes in the up-down direction (Y1-Y2 direction). In FIG. 5, when the ear E on the right side is at the same height position as the center of the opening dimension H1 of the sound generation opening 15R in the up-down direction, the position of the ear E at that time is indicated by (i). When the ear E is at the position (i), the shortest distance from the center of the diaphragm 23 in the speaker unit 20R to the sound sensing portion of the ear E on the right side is indicated by B. When a straight line from the center of the diaphragm 23 to the sound sensing portion of the ear E passes through the upper end of the sound generation opening 15R, the position of the ear E is indicated by (ii). When the ear E is at the position (ii), the shortest distance from the center of the diaphragm 23 to the sound sensing portion of the ear E on the right side is indicated by A.

When the distance between the positions (i) and (ii) of the ear E in the up-down direction is denoted D, A is $\sqrt{(B^2+D^2)}$. The surface area SB of a sphere, with a radius B, including the sound sensing portion in the ear E at the position (i) is $4\pi B^2$. The surface area SA of a sphere, with a radius A, including the sound sensing portion in the ear E at the position (ii) is $4\pi A^2$. Therefore, the difference x in the level of sound pressure generated forward from the speaker unit 20R between when the ear E is at the position (i), and when the ear E is at the position (ii), is given by the equation below:

$$x=\log(4\pi A2)-\log(4\pi B2)$$

Generally, when the difference in the level of sound pressure is 1.5 dB or more, the difference is likely to be sensed by the human ear.

When the opening dimension H1 of the sound generation openings 15L and 15R in the up-down direction is 12 cm (D=6 cm), if B is 10 cm or more, the difference in the level of sound pressure between when the ear E is at the position (i), and when the ear E is at the position (ii), can be suppressed to 1.5 dB or less. In this embodiment, H1 and H2, which are almost equal to each other, are 12 cm, and B is 14 cm.

Figure 8:
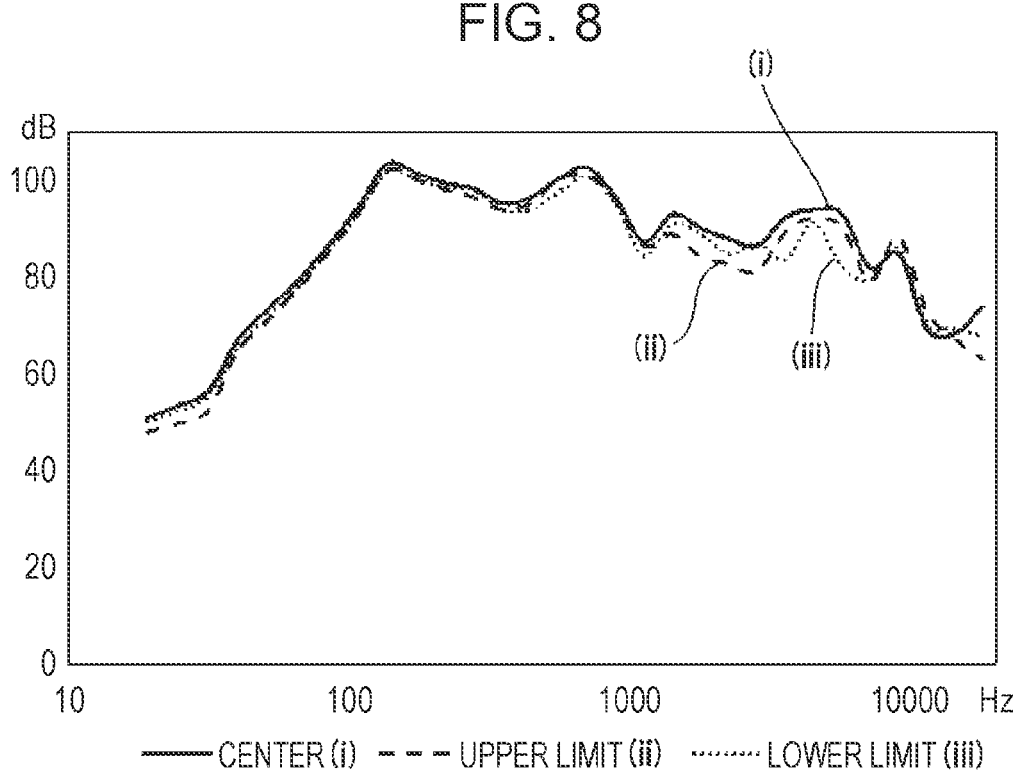
FIG. 8 is a graph illustrating the acoustic effect of the vehicle-mounted acoustic device in the first embodiment.

In FIG. 8, changes in the level of sound pressure at the positions (i), (ii), and (iii) are indicated, in which the position of the ear E is indicated by (iii) when the straight line from the center of the diaphragm 23 to the sound sensing portion of the ear E passes through the lower end of the sound generation opening 15R. FIG. 8 is a logarithmic graph. The horizontal axis indicates the frequency (Hz) of sound pressure (air vibration) generated from the speaker unit, and the vertical axis indicates sound pressure levels (dB) measured at the positions (i), (ii), and (iii). With the vehicle-mounted acoustic device 1 used in measurement, H1 and H2 were 12 cm, and B was 14 cm.

As seen from FIG. 8, when H1 and H2 are 12 cm and B is 14 cm, even when the position of the ear E changes to any of the positions (i), (ii), and (iii), the difference in the sound pressure level that the ear E can sense is in a narrow enough range to be negligible. Since the opening dimension H2 of the bass-reflex ports 17L and 17R in the up-down direction is large, and the opening dimension H1 of the sound generation openings 15L and 15R in the up-down direction are large, even when the position of the ear E changes to any of the positions (i), (ii), and (iii), the relative positions of the speaker units 20L and 20R and bass-reflex ports 17L and 17R remain unchanged in plan view in FIG. 2. That is, the ratio between the linear distance L1 from the speaker units 20L and 20R to the ear E, and the linear distance L2 from the bass-reflex ports 17L and 17R to the ear E remains unchanged. Therefore, even when the ear E is at any of the positions (i), (ii), and (iii), sounds in which low-pitched sounds are enhanced can be obtained, as illustrated in FIG. 8.

Figure 9:
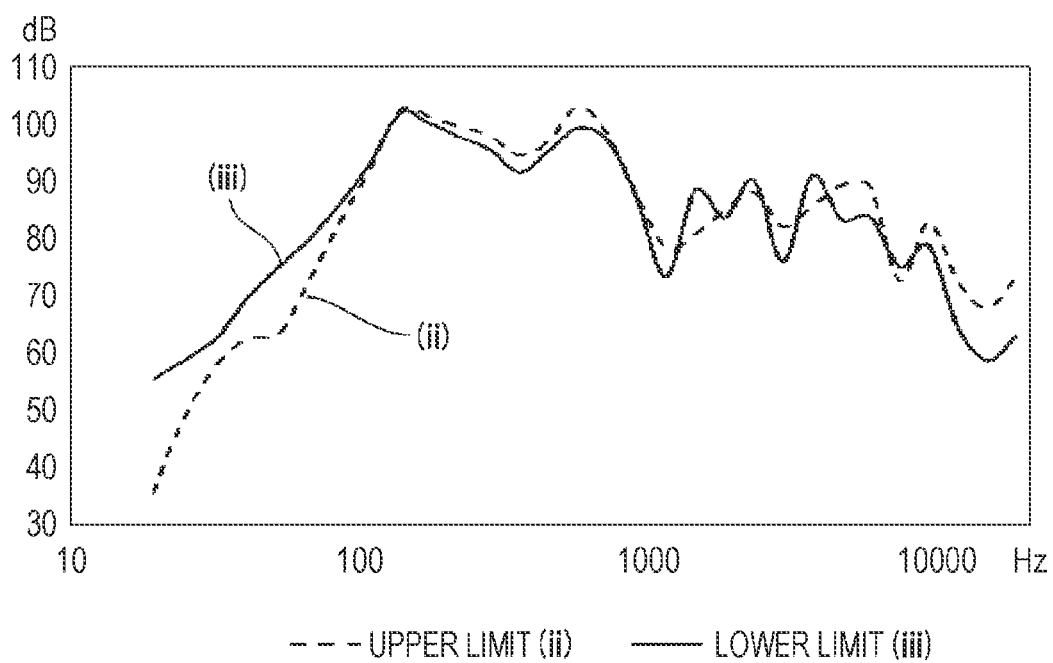
FIG. 9 is a graph illustrating an acoustic effect in a comparative example.

FIG. 9 illustrates an acoustic effect in a comparative example.

In the comparative example, the same vehicle-mounted acoustic device 1 (as when the acoustic effect illustrated in FIG. 8 was measured) was used, and the lower half areas of the sound generation openings 15L and 15R and bass-reflex ports 17L and 17R on the Y2 side were blocked. The upper position (ii) indicated in FIG. 5 and the lower position (iii), which is the position of the ear E when the straight line from the center of the diaphragm 23 to the sound sensing portion of the ear E passes through the lower end of the sound generation opening 15R, were taken as the position of the ear E. Then, sound pressure levels were measured at the positions (ii) and (iii). In the comparative example, since, in the low-frequency band, a timing at which sound pressure levels at the position (iii) undergo the effect of phase inversion changes, a balance between the low-frequency band and the middle-frequency band is lost, as illustrated in FIG. 9. In the high-frequency band as well, a difference of about 10 dB occurred in sound pressure level between when the ear E is at the position (ii) and when the ear E is at the position (iii).

With the vehicle-mounted acoustic device 1 in the embodiment of the present disclosure, however, there was almost no difference in sound pressure level. regardless of the position, (i), (ii) or (iii), of the ear E, as illustrated in FIG. 8. In addition, the vehicle-mounted acoustic device 1 can effectively provide functions as a bass-reflex speaker, and can provide an acoustic effect in which low-pitched sounds are enhanced, regardless of the position, (i), (ii) or (iii), of the ear E. Therefore, even when the sitting height or the position of the ear on the head varies, depending on the sitting listener, or the height position of the ear changes because the listener changes the sitting posture, superior sounds in which low-pitched sounds are enhanced can be always obtained.

Figure 6:
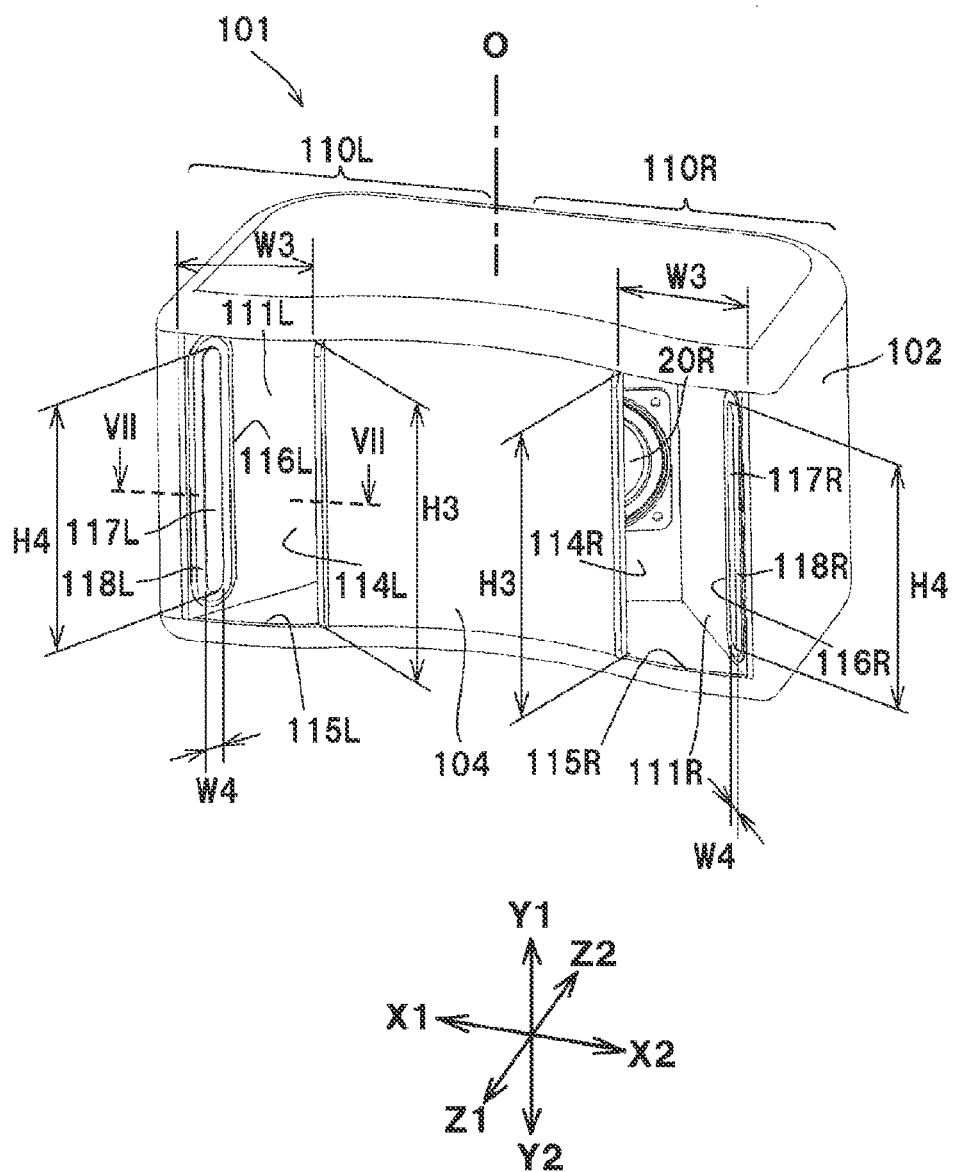
FIG. 6 is a perspective view in which another vehicle-mounted acoustic device, which is a second embodiment of the acoustic device of the present disclosure, is viewed diagonally from the front of the other vehicle-mounted acoustic device.
Figure 7:
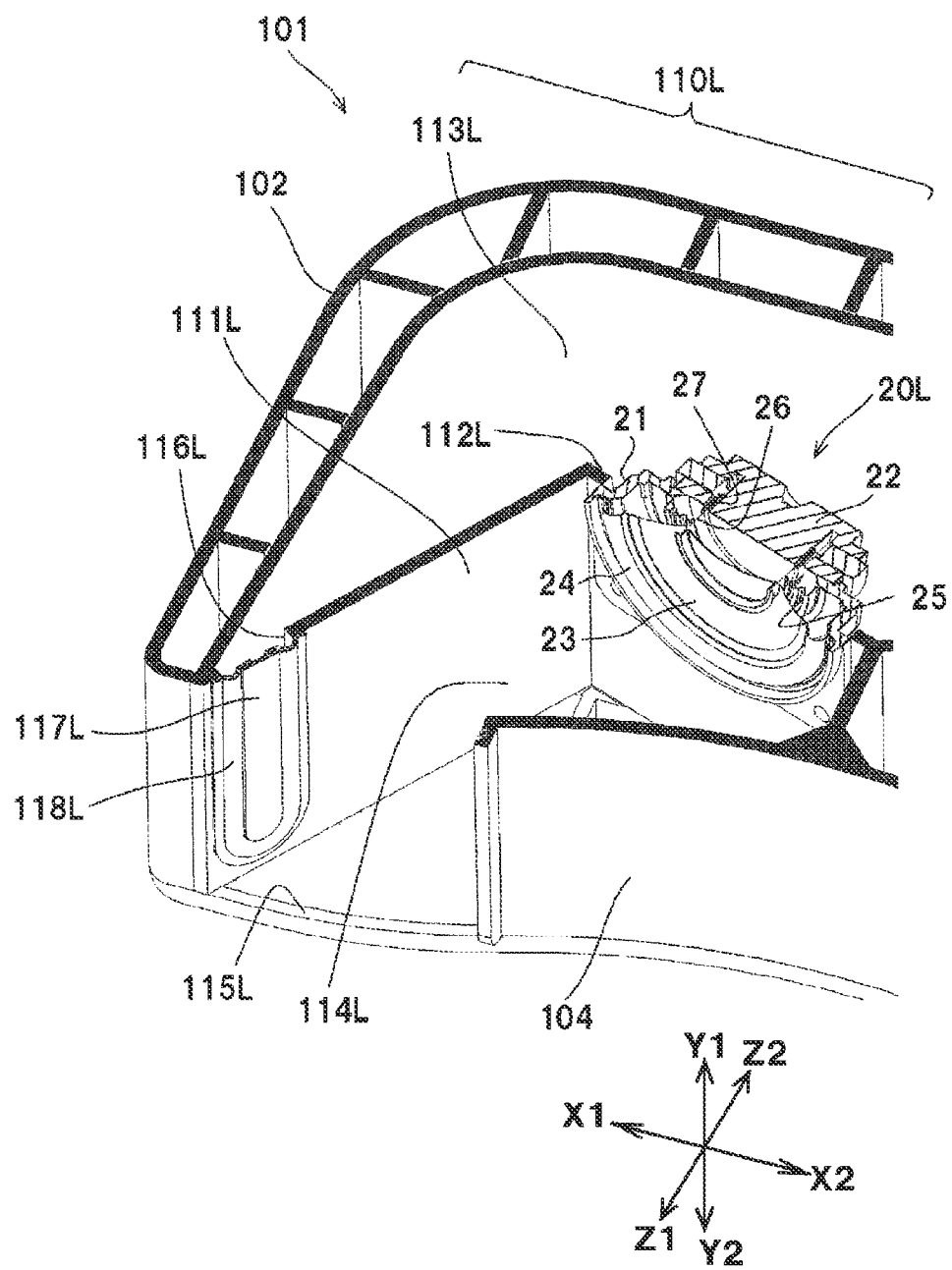
FIG. 7 is a perspective view illustrating a partial section of the vehicle-mounted acoustic device in FIG. 6, as taken along a plane including line VII-VII.

FIGS. 6 and 7 illustrate a vehicle-mounted acoustic device 101 according to a second embodiment of the present disclosure. A case 102 of the vehicle-mounted acoustic device 101 has a head-facing portion 104. The interior of the case 102 is divided into a left acoustic portion 110L and a right acoustic portion 110R, as in the interior of the case 2 of the vehicle-mounted acoustic device 1, illustrated in FIG. 2. Although FIG. 7 illustrates only part of the left acoustic portion 110L, the left acoustic portion 110L and right acoustic portion 110R are line-symmetric in the horizontal direction, with respect to the center line O.

In the left acoustic portion 110L, a front-back partition 111L is provided in the case 102, as illustrated in FIG. 7. Part of the front-back partition 111L is a speaker support 112L. The frame 21 of the speaker unit 20L on the left side is fixed to the speaker support 112L. The speaker unit 20L in FIG. 7 is identical to the speaker unit 20L in FIG. 4. In the left acoustic portion 110L, the front-back partition 111L partitions the interior of the case 102 into an air chamber 113L on the rear side, and a sound generation space 114L on the front side. In the left acoustic portion 110L, a sound generation opening 115L communicating with the sound generation space 114L is formed aside of the head-facing portion 104, so as to be oriented in the forward direction.

An opening 116L extending in the up-down direction (Y1-Y2 direction) is formed at the front (in the Z1 direction) of the front-back partition 111L. In the opening 116L, a passive vibrating body (diaphragm) 117L is provided. The passive vibrating body 117L is positioned in the sound generation space 114L. A damper member 118L is provided between the outer circumference of the passive vibrating body 117L and the inner circumference of the opening 116L. The passive vibrating body 117L is formed from a resin sheet, a paper material, or the like. The damper member 118L is formed from a thin resin sheet, an elastomer sheet, or the like, so as to have certain modulus of elasticity enough to restore the positions of the passive vibrating body 117L in the front-back direction. The opening 116L is completely blocked by the passive vibrating body 117L and damper member 118L. In the right acoustic portion 110R, as well, a passive vibrating body 117R and a damper member 118R are provided in an opening 116R formed in a front-back partition 111R in a sound generation opening 115R, as illustrated in FIG. 6.

With this vehicle-mounted acoustic device 101, sound pressure having an inverted phase is provided from the speaker unit 20L to the air chamber 113L behind the speaker unit 20L. Due to this sound pressure, the passive vibrating body 117L having a predetermined resonance frequency vibrates. When the passive vibrating body 117L vibrates, sound pressure in which low-pitched sounds are enhanced is generated forward. Sound pressure generated forward from the speaker unit 20L and sound pressure in which low-pitched sounds are enhanced due to the vibration of the passive vibrating body 117L are directed forward from the sound generation opening 115L, and is then provided to the ear E on the left side. This operation is also true for the right acoustic portion 110R.

With the sound generation opening 115L on the left side and the sound generation opening 115R on the right side, the opening dimension H3 in the up-down direction (Y1-Y2 direction) is larger than the opening dimension W3 in the horizontal direction (X1-X2 direction), as illustrated in FIG. 6. With the passive vibrating body 117L on the left side and the passive vibrating body 117R on the right side, the dimension H4 in the up-down direction is larger than the dimension W4 in the horizontal direction. The values of the opening dimensions W3 and H3 of the sound generation openings 115L and 115R in the vehicle-mounted acoustic device 101 are preferably equal to the values of the opening dimensions W1 and H1 of the sound generation openings 15L and 15R in the vehicle-mounted acoustic device 1, illustrated in FIG. 3. The values of the dimensions W4 and H4 of the passive vibrating bodies 117L and 117R in the vehicle-mounted acoustic device 101 are preferably equal to the values of the opening dimensions W2 and H2 of the bass-reflex ports 17L and 17R in the vehicle-mounted acoustic device 1, illustrated in FIG. 3.

With the vehicle-mounted acoustic device 101 illustrated in FIGS. 6 and 7, the opening dimension H3 of the sound generation openings 115L and 115R in the up-down direction and the dimension H4 of the passive vibrating bodies 117L and 117R in the up-down direction are almost equal to each other. Both the sound generation openings 115L and 115R and passive vibrating bodies 117L and 117R are elongated in the up-down direction. Therefore, even when the position of the ear E of the listener changes in the up-down direction, an acoustic effect in which low-pitched sounds are enhanced and sound pressure is well-balanced can be always obtained.

Specific embodiments and specific examples of the present disclosure have been described above with reference to the attached drawings. The specific embodiments and specific examples described above are only specific examples of the present disclosure, which are used to understand the present disclosure, rather than limit the scope of the present disclosure. Those skilled in the art can make various modifications, combinations and reasonable omissions of elements in specific embodiments and specific examples based on the technical ideas of the present disclosure, and the embodiments thus obtained are also included in the scope of the present disclosure. For example, the above-mentioned embodiments and specific examples may be combined with each other, and the combined embodiments are also included in the scope of the present disclosure. Therefore, it is intended that this disclosure not be limited to the particular embodiments disclosed, but that the invention will include all embodiments falling within the scope of the appended claims.

What is claimed is:

1. An acoustic device, wherein a direction in which a face of a listener is oriented is referred to as a forward direction, a side opposite to a side in the forward direction is referred to as a rear side, a direction in which left and right ears of the listener are aligned is referred to as a horizontal direction, and a direction orthogonal to both the forward direction and the horizontal direction is referred to as an up-down direction, the acoustic device comprising:

a case, a pair of speaker units disposed in the case, and a pair of bass-reflex ports disposed in the case, such that each pair is line-symmetric in the horizontal direction with respect to a center line extending in an up-down direction, wherein:

the case is positioned on the rear side of the listener, and the respective speaker unit is disposed so that a sound generated by the speaker unit is directed forward;

the case includes an air chamber to which air vibration on the rear side of the respective speaker unit is transmitted, the respective bass-reflex port that communicates with the air chamber and is open in the forward direction, a head-facing portion that faces a back of a head fo the listener, sound generation spaces to each of which air vibration in front of one of the speaker units is transmitted, and sound generation openings each of which communicates with one of the sound generation spaces and is open at one of both ends of the head-facing portion in the horizontal direction;

with the bass-reflex ports, an opening dimension in the up-down direction is larger than an opening dimension in the horizontal direction;

each of the bass-reflex ports is open on an outside of one of the sound generation openings in the horizontal direction;

with the sound generation openings as well, an opening dimension in the up-down direction is larger than an opening dimension in the horizontal direction; and, the opening dimension of the sound generation openings in the up-down direction and the opening dimension of the bass-reflex ports in the up-down direction are generally equal to each other such that a difference between the opening dimension of the sound generation openings and the opening dimension of the bass-reflex ports is 10% or less of the larger ones of the opening dimensions.

2. An acoustic device, wherein a direction in which a face of a listener is oriented is referred to as a forward direction, a side opposite to a side in the forward direction is referred to as a rear side, a direction in which left and right ears of the listener are aligned is referred to as a horizontal direction, and a direction orthogonal to both the forward direction and the horizontal direction is referred to as an up-down direction, the acoustic device comprising:

a case, a pair of speaker units disposed in the case, and a pair of passive vibrating bodies disposed in the case, such that each pair is line-symmetric in the horizontal direction with respect to a center line extending in an up-down direction, wherein:

the case is positioned on the rear side of the listener, and the respective speaker unit is disposed so that a sound generated by the speaker unit is directed forward;

the case includes an air chamber to which air vibration on the rear side of the respective speaker unit is transmitted, the respective passive vibrating body that receives pressure in the air chamber and operates, a head-facing portion that faces a back of a head of the listener, sound generation spaces to each of which air vibration in front of one of the speaker units is transmitted, and sound generation openings each of which communicates with one of the sound generation spaces and is open at one of both ends of the head facing proportion in the horizontal direction;

each of the passive vibrating bodies is positioned in one of the sound generation spaces;

the respective passive vibrating body is oriented in the forward direction, and a dimension of the respective passive vibrating body in the up-down direction is larger than a dimension of the passive vibrating body in the horizontal direction;

with the sound generation openings as well, an opening dimension in the up-down direction is larger than an opening dimension in the horizontal direction; and, the opening dimension of the sound generation openings in the up-down direction and the dimension of the passive vibrating bodies in the up-down direction are generally equal to each other such that a difference between the opening dimension of the sound generation openings and the dimension of the passive vibrating bodies is 10% or less of the larger ones of the opening dimensions.

\* \* \* \* \*